United States Patent
Manther

(10) Patent No.: US 9,447,709 B1
(45) Date of Patent: Sep. 20, 2016

(54) MULTI-POSITION CAMSHAFT PHASER WITH TWO ONE-WAY WEDGE CLUTCHES

(71) Applicant: Schaeffler Technologies AG & Co. KG, Herzogenaurach (DE)

(72) Inventor: Debora Manther, Royal Oak, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/730,468

(22) Filed: Jun. 4, 2015

(51) Int. Cl.
*F01L 1/344* (2006.01)

(52) U.S. Cl.
CPC .......... *F01L 1/34409* (2013.01); *F01L 1/3442* (2013.01); *F01L 1/34403* (2013.01); *F01L 2001/34459* (2013.01); *F01L 2820/031* (2013.01)

(58) Field of Classification Search
CPC . F01L 1/34403; F01L 1/34409; F01L 1/344; F01L 2001/3445; F01L 1/352; F01L 2820/031
USPC .......................................... 123/90.15, 90.17
See application file for complete search history.

(56) References Cited

U.S. PATENT DOCUMENTS

2015/0300214 A1* 10/2015 Hemphill ................ F01L 1/352
123/90.15

OTHER PUBLICATIONS

U.S. Appl. No. 14/686,478, filed Apr. 14, 2015.

* cited by examiner

*Primary Examiner* — Thomas Denion
*Assistant Examiner* — Jorge Leon, Jr.
(74) *Attorney, Agent, or Firm* — Antun M. Peakovic; Chester Paul Maliszewski

(57) ABSTRACT

A camshaft phaser, including a stator arranged to receive torque from an engine; a rotor arranged to be non-rotatably connected to a camshaft; first and second ramp rings radially disposed about the rotor and non-rotatably connected to the rotor; a first wedge plate radially disposed between the stator and the first ramp ring; a second wedge plate radially disposed between the stator and the second ramp ring; and a displacement assembly arranged to, for an advance mode, displace the first ramp ring in a first axial direction to enable rotation of the rotor, with respect to the stator, in a first circumferential direction, and for a retard mode, displace the second ramp ring in a second axial direction, opposite the first axial direction, to enable rotation of the rotor, with respect to the stator, in a second circumferential direction, opposite the first circumferential direction.

21 Claims, 18 Drawing Sheets

MULTI-POSITION CAMSHAFT PHASER WITH TWO ONE-WAY WEDGE CLUTCHES

TECHNICAL FIELD

The present disclosure relates to a multi-position camshaft phaser with two one-way wedge clutches. In particular, the two one-way wedge clutches are used to advance and retard the phase of the rotor with respect to the stator.

BACKGROUND

It is known to use fluid pressure in chambers created by respective portions of a stator and a rotor for a camshaft phaser to maintain and shift a rotational position of the rotor with respect to the stator. This known technique involves complicated hydraulic systems and controls.

SUMMARY

According to aspects illustrated herein, there is provided a camshaft phaser, including a stator arranged to receive torque from an engine; a rotor arranged to be non-rotatably connected to a camshaft; first and second ramp rings radially disposed about the rotor and non-rotatably connected to the rotor; a first wedge plate radially disposed between the stator and the first ramp ring; a second wedge plate radially disposed between the stator and the second ramp ring; and a displacement assembly arranged to, for an advance mode, displace the first ramp ring in a first axial direction to enable rotation of the rotor, with respect to the stator, in a first circumferential direction, and for a retard mode, displace the second ramp ring in a second axial direction, opposite the first axial direction, to enable rotation of the rotor, with respect to the stator, in a second circumferential direction, opposite the first circumferential direction.

According to aspects illustrated herein, there is provided a camshaft assembly, including camshaft phaser including: a stator including an input gear; a rotor arranged to be non-rotatably connected to a camshaft and including a central opening through which an axis of rotation for the camshaft phaser passes; first and second ramp rings radially disposed about the rotor and non-rotatably connected to the rotor; a first wedge plate radially disposed between the stator and the first ramp ring; a second wedge plate radially disposed between the stator and the second ramp ring; and a displacement assembly including at least one first and second channels opening to the central opening, a first resilient element directly connected to the first ramp ring, and a second resilient element directly connected to the second ramp ring. For an advance mode, the first resilient element is arranged to displace the first ramp ring in a first axial direction to enable rotation of the rotor, with respect to the stator, in a first circumferential direction, and for a retard mode, the second resilient element is arranged to displace the second ramp ring in a second axial direction, opposite the first axial direction, to enable rotation of the rotor, with respect to the stator, in a second circumferential direction, opposite the first circumferential direction. For the advance mode, the at least one first channel is arranged to transmit pressurized fluid to displace the first ramp ring in the first axial direction to enable rotation of the rotor, with respect to the stator, in the first circumferential direction, and for the retard mode, the at least one second channel is arranged to transmit pressurized fluid to displace the second ramp ring in the second axial direction, opposite the first axial direction, to enable rotation of the rotor, with respect to the stator, in the second circumferential direction, opposite the first circumferential direction.

According to aspects illustrated herein, there is provided a method of fabricating a camshaft phaser, including: fabricating a rotor including a core portion, a central opening through which an axis of rotation for the camshaft phaser passes, at least one first channel with at least one first opening at the central opening and at least one second opening at the core portion, and at least one second channel with at least one third opening at the central opening and at least one fourth opening at the core portion; fabricating a first ramp ring, including a first plurality of ramps; disposing the first ramp ring radially about the rotor and axially aligned with the at least one second opening; non-rotatably connecting the first ramp ring to the rotor; fabricating a second ramp ring, including a second plurality of ramps; disposing the second ramp ring radially about the rotor, axially aligned with the at least one fourth opening, and so that the core portion is axially disposed between the first and second ramp rings; non-rotatably connecting the second ramp ring to the rotor; installing a first wedge plate, including a third plurality of ramps, radially between the stator and the first ramp ring; engaging the first plurality of ramps with the third pluralities of ramps; installing a second wedge plate, including a fourth plurality of ramps, radially between the stator and the second ramp ring; engaging the second plurality of ramps with the fourth plurality of ramps; directly connecting a first resilient element to the first ramp ring; urging the first ramp ring toward the rotor with the first resilient element; directly connecting a second resilient element to the second ramp ring; urging the second ramp ring toward the rotor with the second resilient element; and installing the rotor and the first and second wedge plates within a stator including an input gear.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
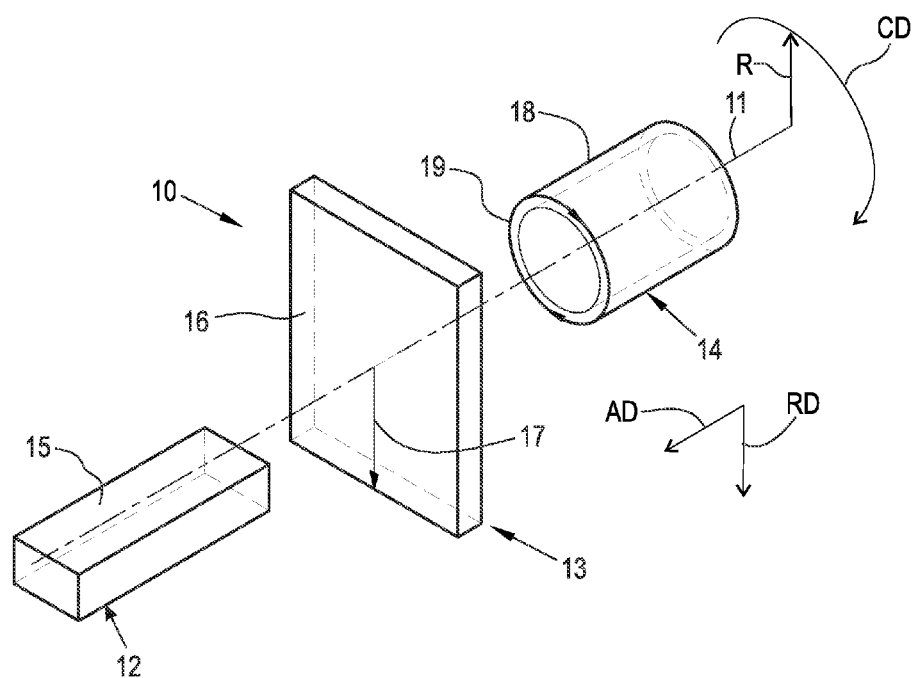
FIG. 1 is a perspective view of a cylindrical coordinate system demonstrating spatial terminology used in the present application.

FIG. 1 is a perspective view of cylindrical coordinate system 10 demonstrating spatial terminology used in the present application. The present application is at least partially described within the context of a cylindrical coordinate system. System 10 includes longitudinal axis 11, used as the reference for the directional and spatial terms that follow. Axial direction AD is parallel to axis 11. Radial direction RD is orthogonal to axis 11. Circumferential direction CD is defined by an endpoint of radius R (orthogonal to axis 11) rotated about axis 11.

To clarify the spatial terminology, objects 12, 13, and 14 are used. An axial surface, such as surface 15 of object 12, is formed by a plane parallel to axis 11. Axis 11 is coplanar with planar surface 15; however it is not necessary for an axial surface to be coplanar with axis 11. A radial surface, such as surface 16 of object 13, is formed by a plane orthogonal to axis 11 and coplanar with a radius, for example, radius 17. Surface 18 of object 14 forms a circumferential, or cylindrical, surface. For example, circumference 19 forms a circle on surface 18. As a further example, axial movement is parallel to axis 11, radial movement is orthogonal to axis 11, and circumferential movement is parallel to circumference 19. Rotational movement is with respect to axis 11. The adverbs "axially," "radially," and "circumferentially" refer to orientations parallel to axis 11, radius 17, and circumference 19, respectively.

Figure 2:
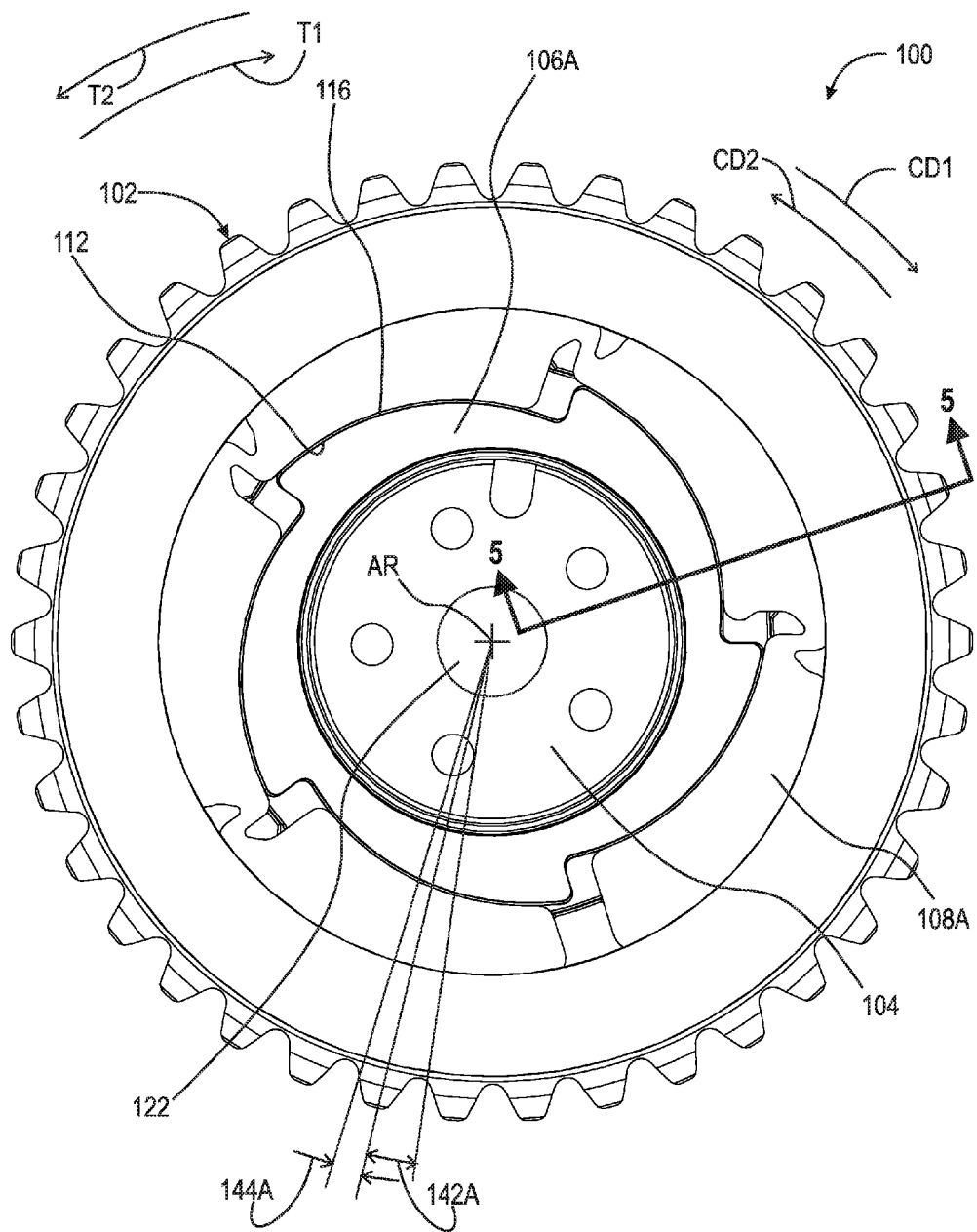
FIG. 2 is a front view of a camshaft phaser with two one-way wedge clutches.

FIG. 2 is a front view of camshaft phaser 100 with two one-way wedge clutches.

Figure 3:
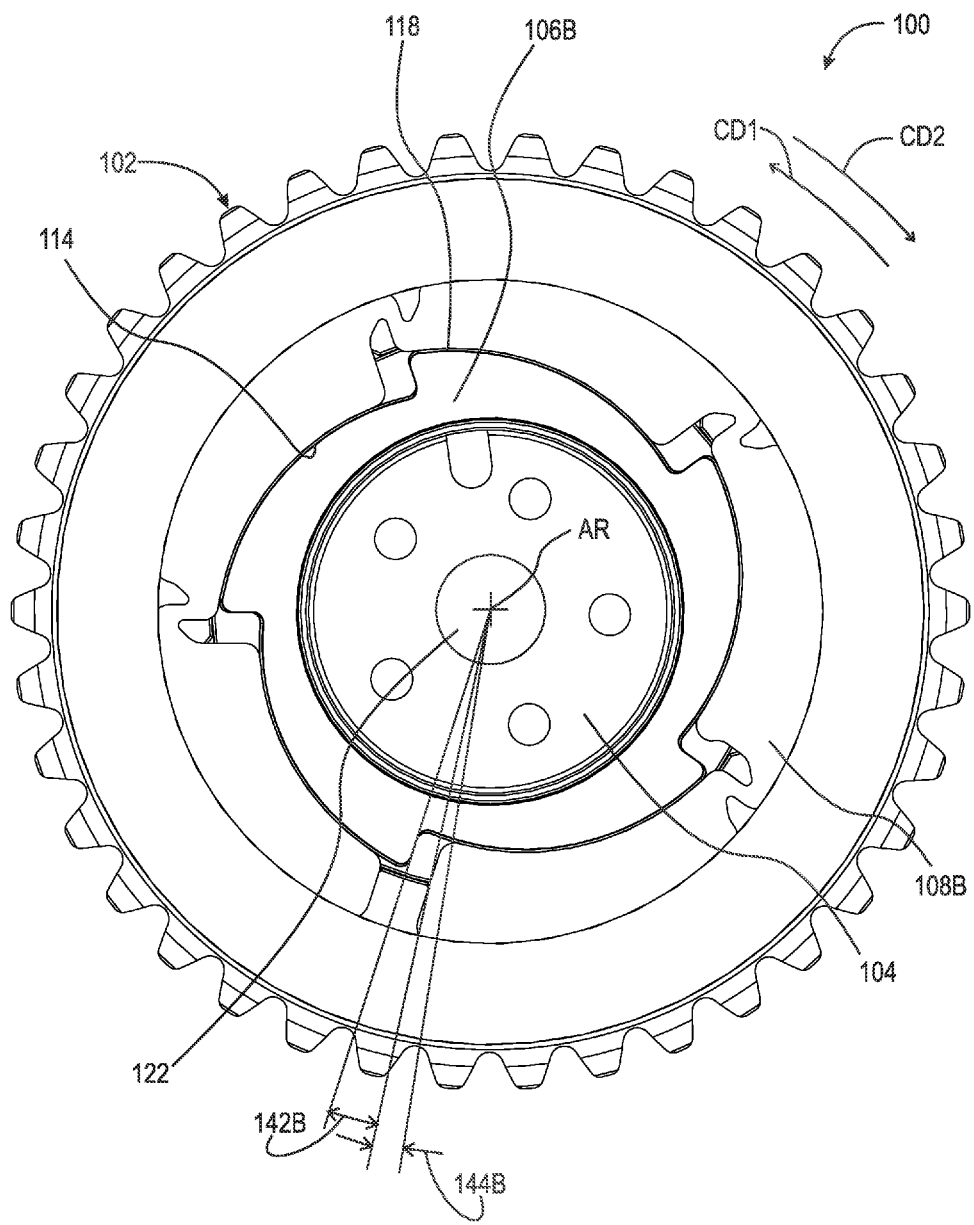
FIG. 3 is a rear view of the camshaft phaser in FIG. 2.

FIG. 3 is a rear view of camshaft phaser 100 in FIG. 2.

Figure 4:
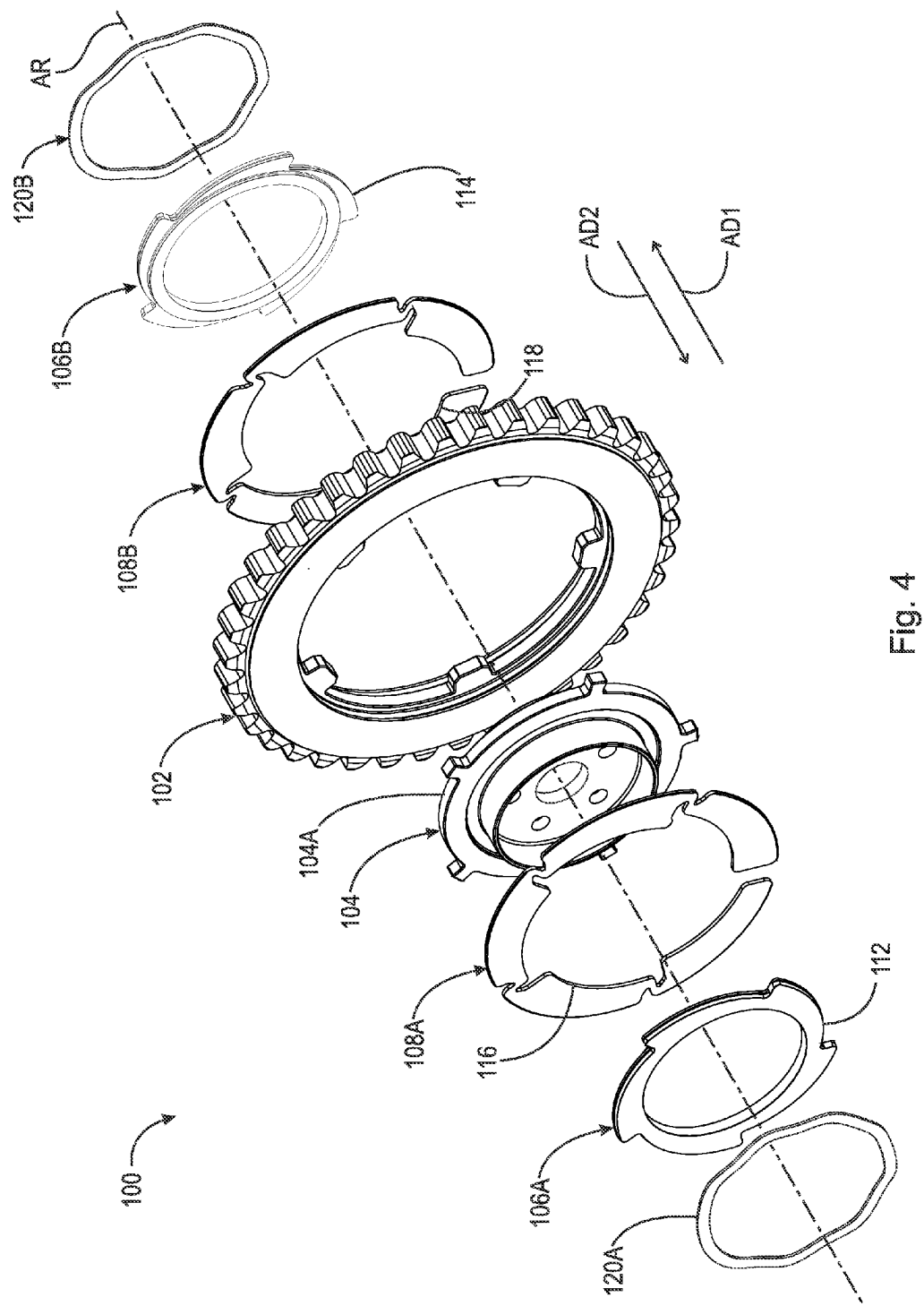
FIG. 4 is a perspective exploded view of the camshaft phaser in FIGS. 2 and 3.

FIG. 4 is a perspective exploded view of camshaft phaser 100 in FIGS. 2 and 3.

Figure 5:
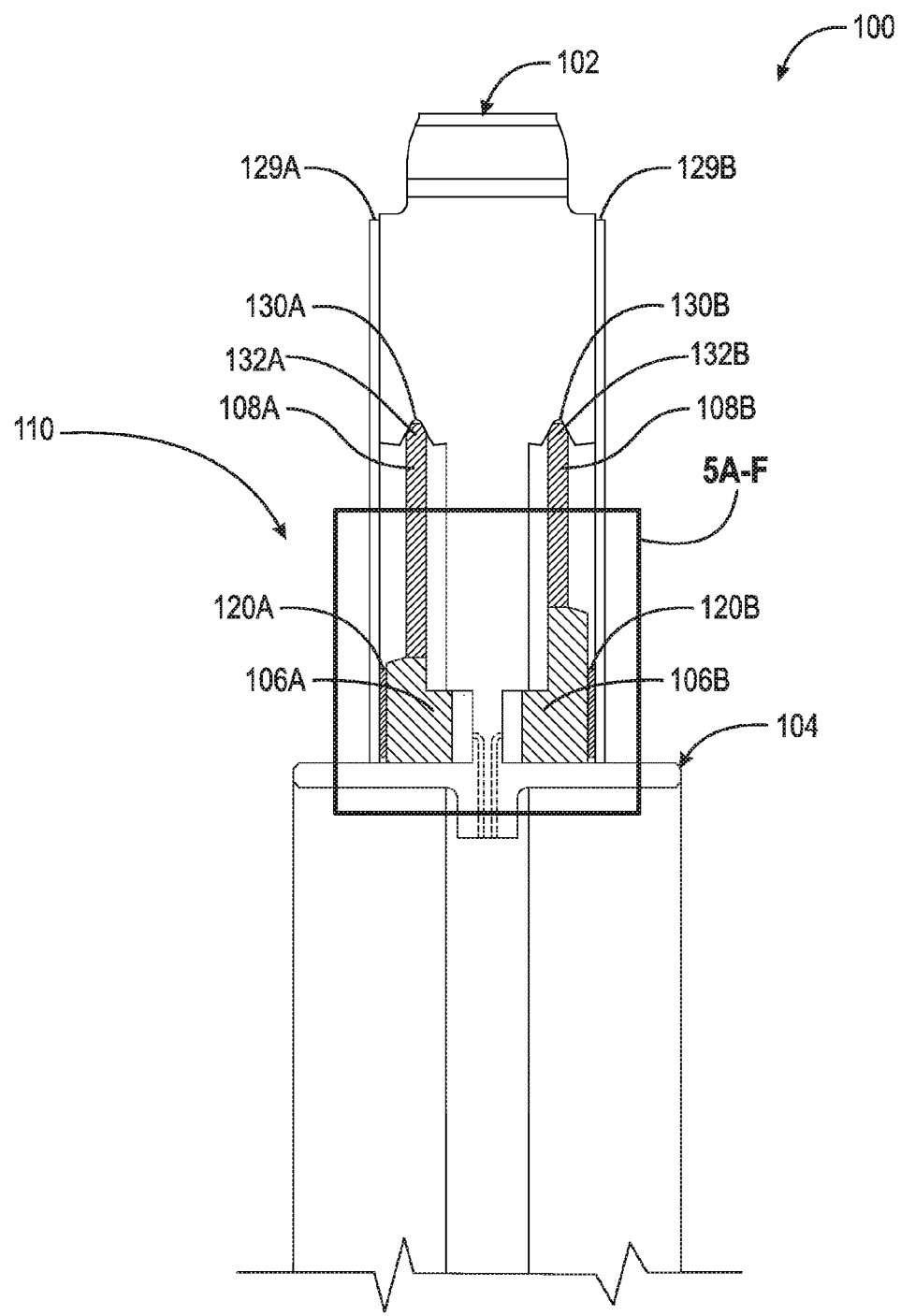
FIG. 5 is a cross-sectional view taken generally along line 5-5 in FIG. 2 with side plates added.

FIG. 5 is a cross-sectional view taken generally along line 5-5 in FIG. 2 with side plates added.

Figure 5A:
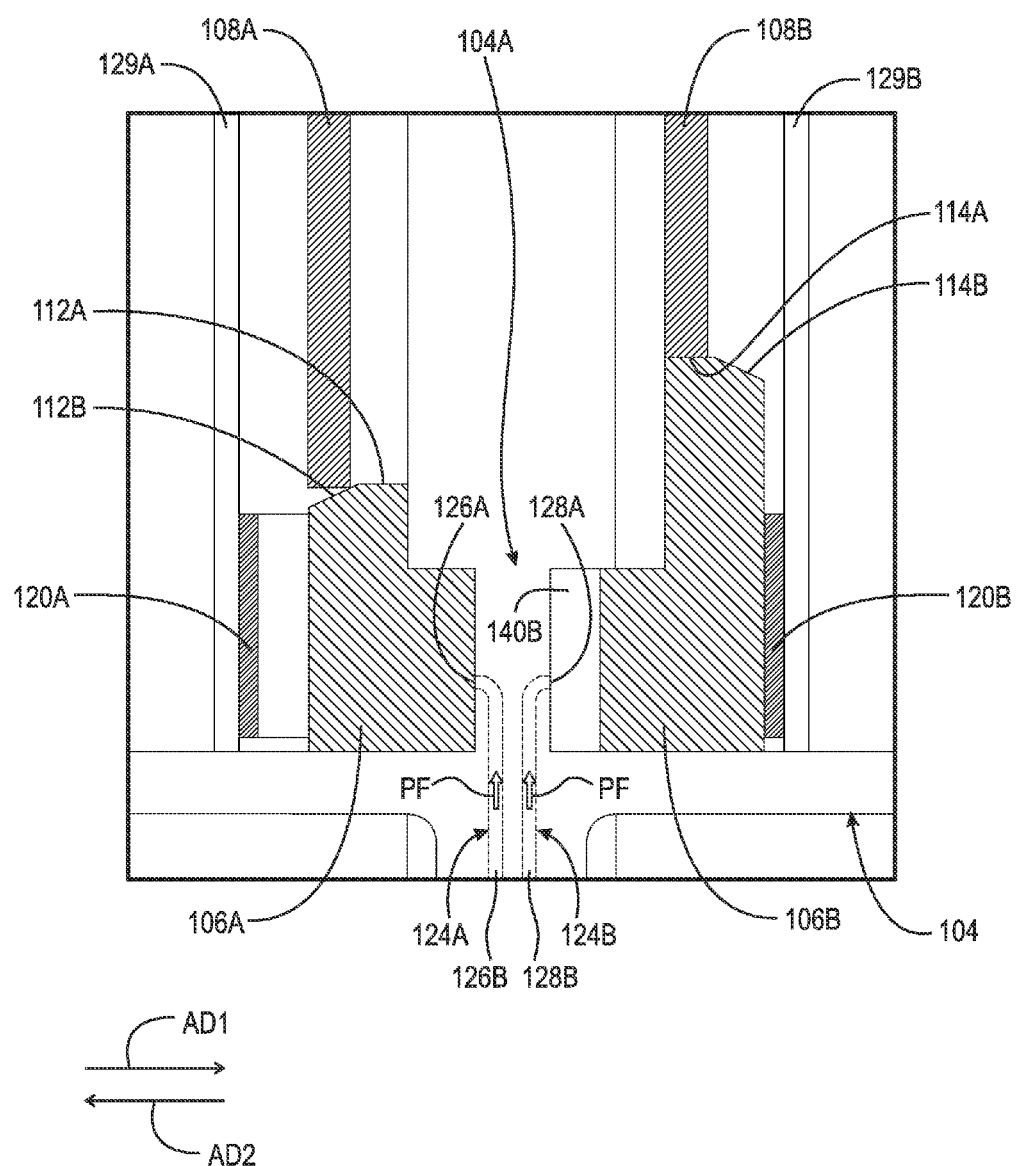
FIG. 5A is a detail of area 5A-F in FIG. 5 with the camshaft phaser in an advance mode.

FIG. 5A is a detail of area 5A-F in FIG. 5 with camshaft phaser 100 in an advance mode.

Figure 5B:
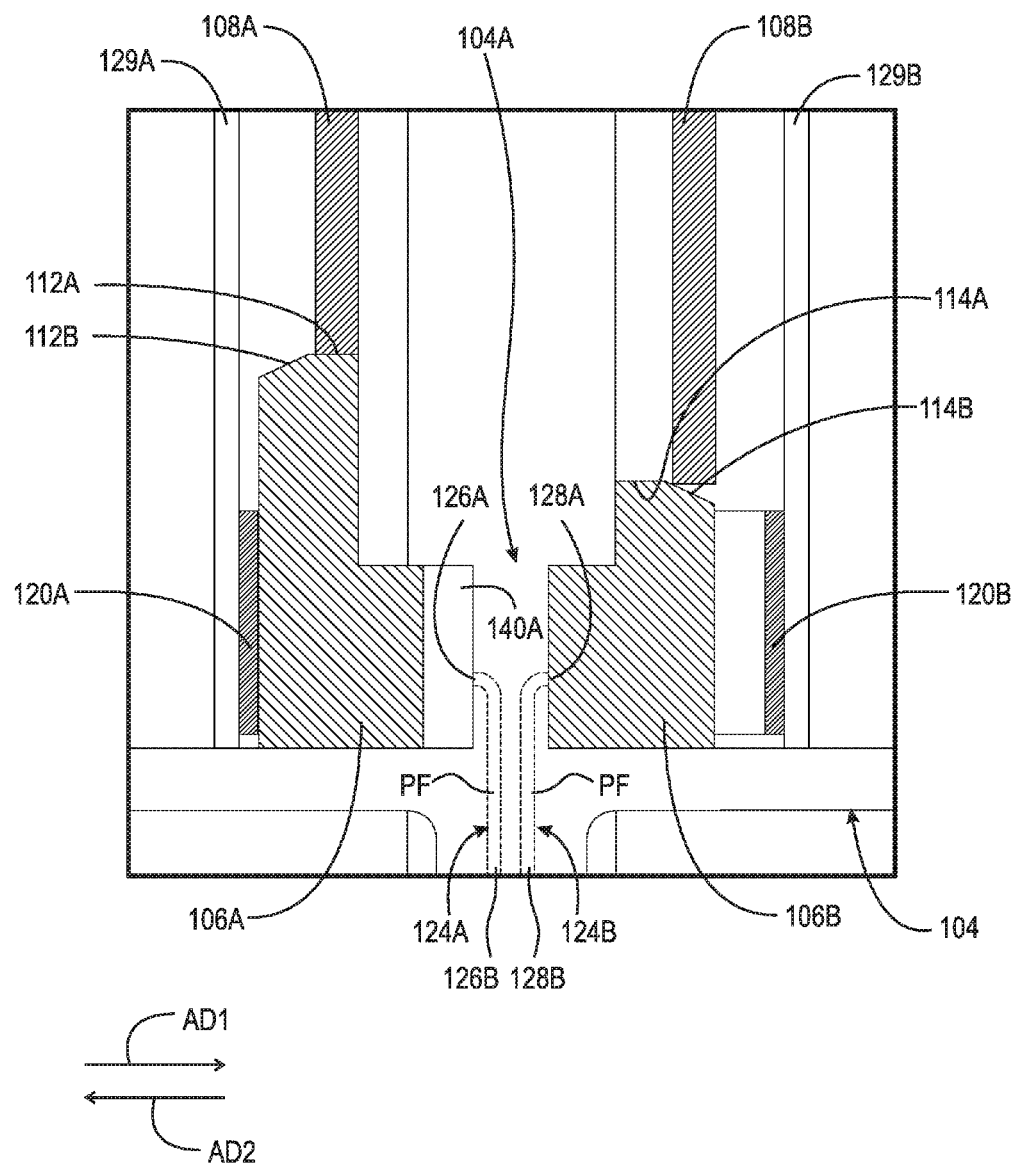
FIG. 5B is a detail of area 5A-F in FIG. 5 with the camshaft phaser in a retard mode.

FIG. 5B is a detail of area 5A-F in FIG. 5 with camshaft phaser 100 in a retard mode. The following should be viewed in light of FIGS. 2 through 5B. Phaser 100 includes: axis of rotation AR, rotatable stator 102, rotatable rotor 104, ramp rings 106A and 106B radially disposed about the rotor and non-rotatably connected to the rotor, and wedge plates 108A and 108B. Wedge plate 108A is radially disposed between the stator and ramp ring 106A. Wedge plate 108B is radially disposed between the stator and ramp ring 106B. Stator 102 is arranged to receive torque from an engine. Rotor 104 is arranged to be non-rotatably connected to a camshaft.

Phaser 100 includes displacement assembly 110 arranged to: for an advance mode, displace ramp ring 106A in axial direction AD1 to enable rotation of the rotor, with respect to the stator, in circumferential direction CD1; and for a retard mode, displace ramp ring 106B in axial direction AD2, opposite direction AD1, to enable rotation of the rotor, with respect to the stator, in circumferential direction CD2, opposite circumferential direction CD1. By "non-rotatably connected" two components, we mean that whenever the first component rotates, the second component rotates with the first component, and whenever the second component rotates, the first component rotates with the second component. This same definition applies to more than two components that are non-rotatably connected.

For the advance mode, displacement assembly 110 is arranged to displace ramp ring 106A in axial direction AD1 to block rotation of the rotor, with respect to the stator, in circumferential direction CD2. For the retard mode, displacement assembly 110 is arranged to displace ramp ring 106A in axial direction AD2 to block rotation of the rotor, with respect to the stator, in circumferential direction CD1.

Figure 6:
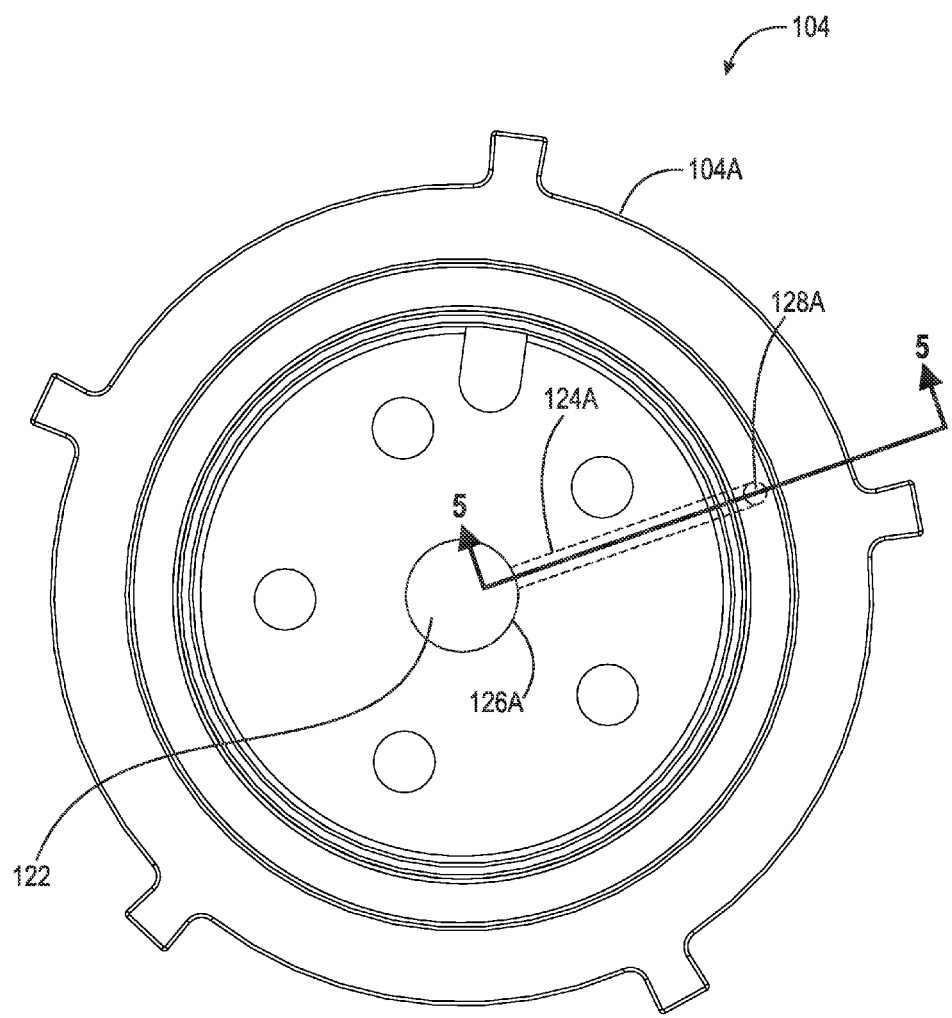
FIG. 6 is a front perspective view of the rotor in FIG. 2.

FIG. 6 is a front perspective view of rotor 104 in FIG. 2.

Figure 7:
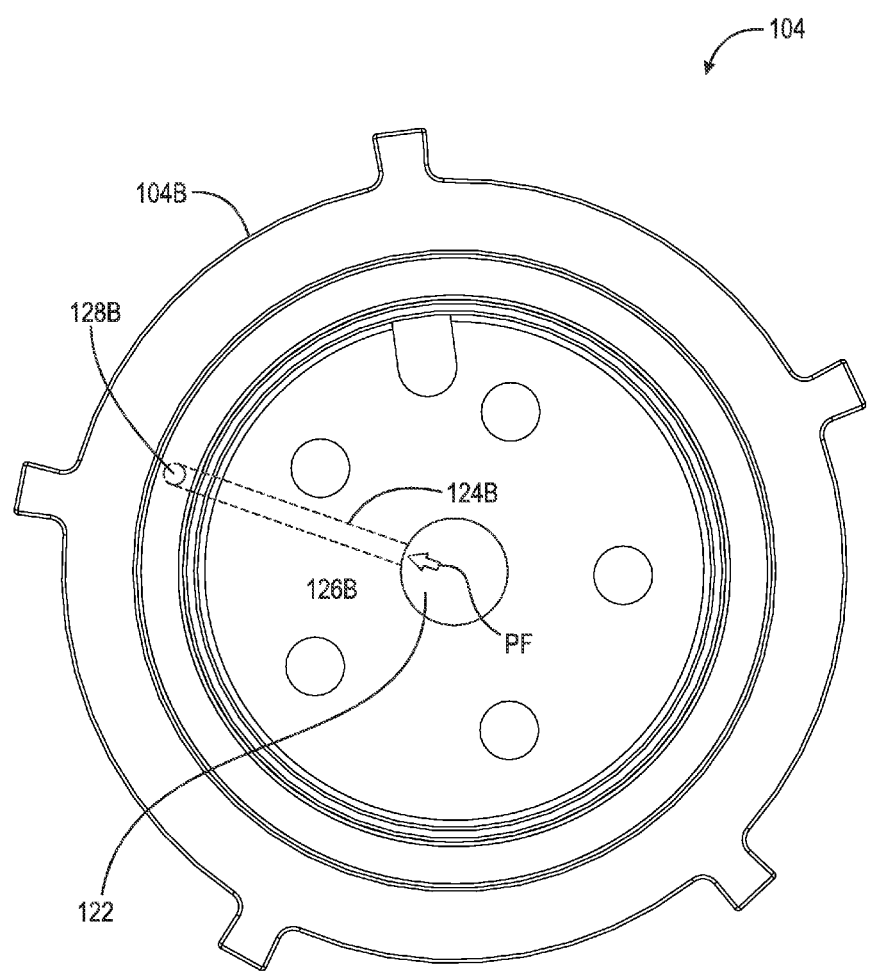
FIG. 7 is a rear perspective view of the rotor in FIG. 3.

FIG. 7 is a rear perspective view of rotor 104 in FIG. 3.

Figure 8:
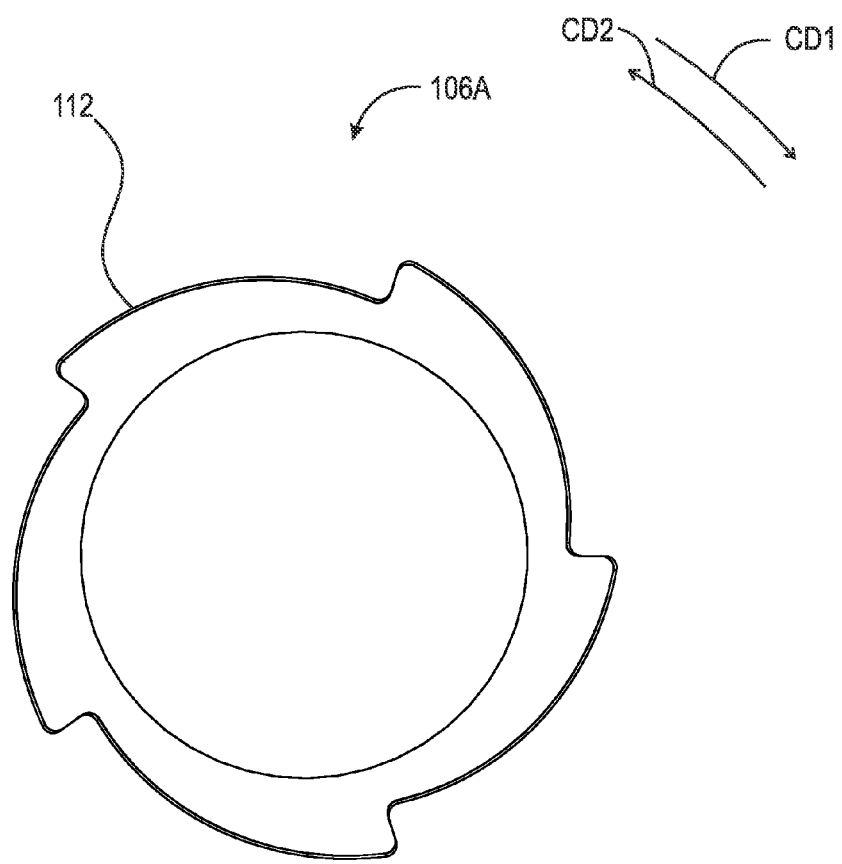
FIG. 8 is a front perspective view of the ramp ring in FIG. 2.

FIG. 8 is a front perspective view of ramp ring 106A in FIG. 2.

Figure 9:
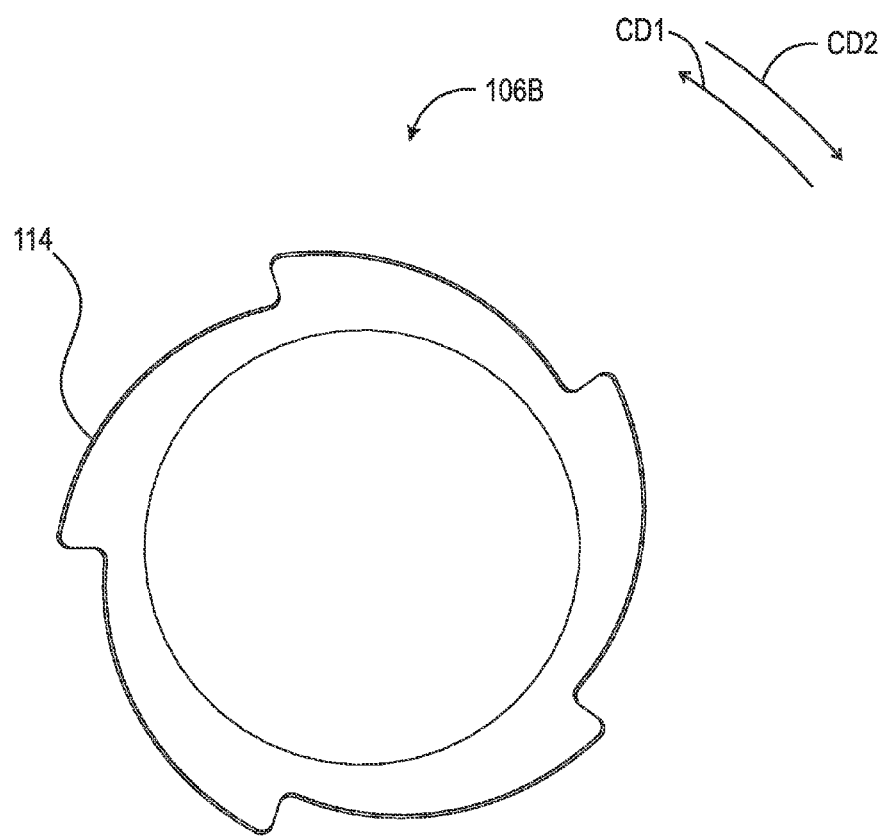
FIG. 9 is a rear perspective view of the ramp ring in FIG. 3.

FIG. 9 is a rear perspective view of ramp ring 106B in FIG. 3.

Figure 10:
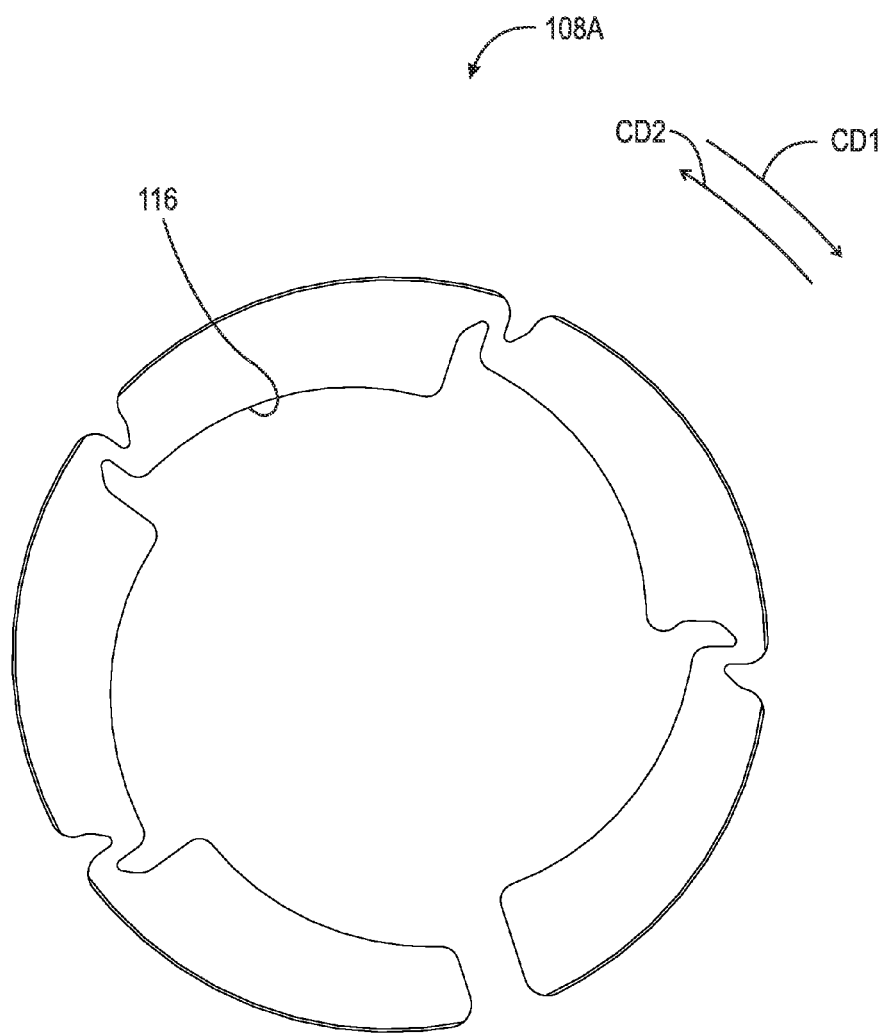
FIG. 10 is a front view of the wedge plate in FIG. 2.

FIG. 10 is a front view of wedge plate 108A in FIG. 2.

Figure 11:
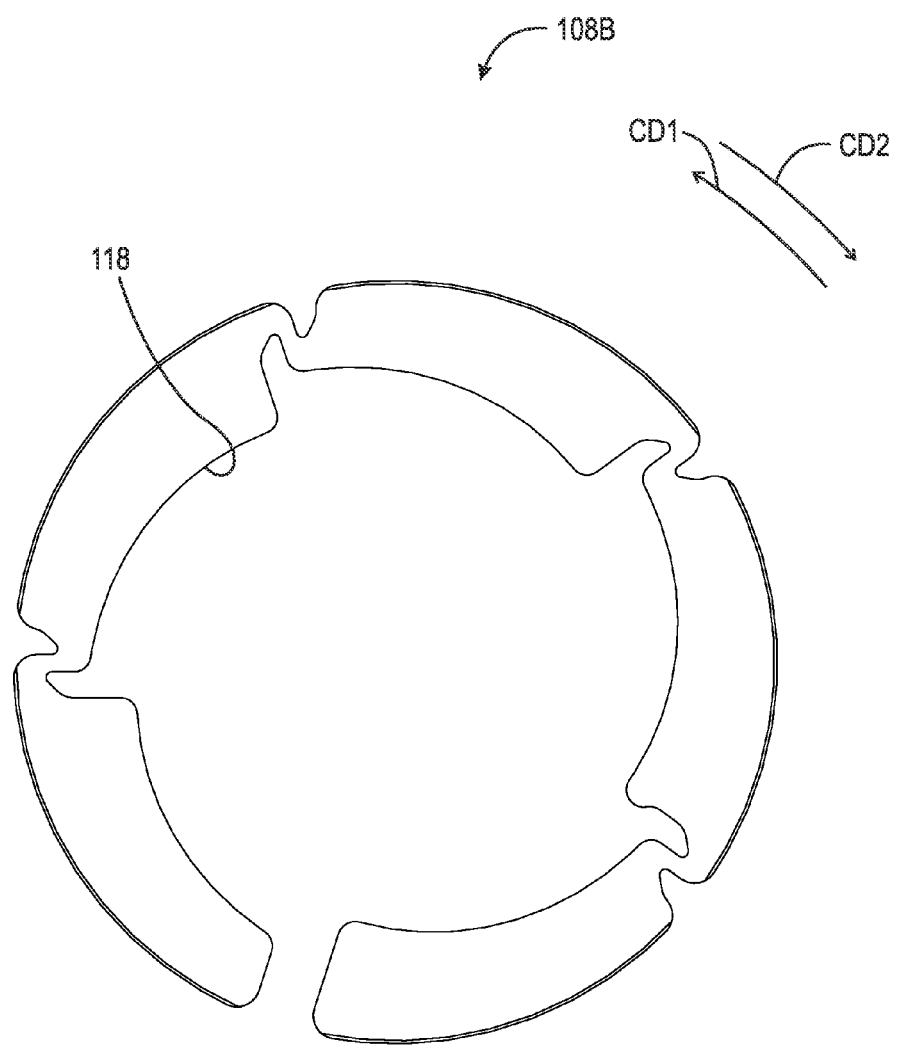
FIG. 11 is a rear view of the wedge plate in FIG. 3.

FIG. 11 is a rear view of wedge plate 108B in FIG. 3. The following should be viewed in light of FIGS. 2 through 10. Ramp rings 106A and 106B include ramps 112 and 114, respectively. Wedge plates 108A and 108B include ramps 116 and 118, respectively, engaged with ramps 112 and 114, respectively. For the advance mode, ramps 114 are arranged to slide along ramps 118 in circumferential direction CD2. For the retard mode, ramps 112 are arranged to slide along ramps 116 in circumferential direction CD1. In the example embodiment of FIGS. 2 through 11: each ramp 112 includes portion 112A and portion 112B sloping radially inward in direction AD2; and each ramp 114 includes portion 114A and portion 114B sloping radially inward in direction AD1.

The following should be viewed in light of FIGS. 2 through 11. In an example embodiment: displacement assembly 110 includes resilient elements 120A and 120B; and rotor 104 includes: central opening 122 through which axis of rotation AR for camshaft phaser 100 passes; and central portion 104A axially disposed between wedge plates 108A and 108B. In an example embodiment, displacement assembly 110 includes: at least one channel 124A in rotor 104 and at least one channel 124B in rotor 104. Channel 124A includes opening 126A at central portion 104A and opening 126B at central opening 122. Channel 124B includes opening 128A at central portion 104A and opening 128B at central opening 122. Hereinafter: at least one channel 124A and 124B are referred to as channel 124A and 124B; and at least one opening 126A and 126B are referred to as opening 126A and 126B. In an example embodiment, phaser 100 includes side plates 129A and 129B. Resilient element 120A is axially disposed between side plate 129A and central portion 104A. Resilient element 120B is axially disposed between side plate 129B and central portion 104A. Resilient element 120A reacts against side plate 129A to generate force in direction AD1. Resilient element 120B reacts against side plate 129B to generate force in direction AD2.

Element 120A is arranged to displace ramp ring 106A in axial direction AD1, and element 120B is arranged to displace ramp ring 106B in axial direction AD2. Each channel 124A is arranged to receive pressurized fluid PF to displace ramp ring 106A in axial direction AD1; and each channel 124B is arranged to receive pressurized fluid PF to displace ramp ring 106B in axial direction AD2.

In an example embodiment, stator 102 includes circumferentially disposed and tapered grooves 130A and 130B and wedge plates 108A and 108B include chamfered radially outer portions 132A and 132B. In the example embodiment of FIGS. 2 through 11: as wedge plate 108A is displaced radially outward as described above, portion 132A comes into contact with and frictionally engages groove 130A; and as wedge plate 108B is displaced radially outward as described above, portion 132B comes into contact with and frictionally engages groove 130B.

For the advance mode, resilient element 120A is arranged to push ramp ring 106A in direction AD1 so that wedge plate 108A slides radially inward on portion 112B, breaking or diminishing frictional contact between groove 130A and portion 132A and enabling rotation between the combination of rotor 104 and wedge plate 108A, in direction CD1, with respect to stator 102. For the advance mode, pressurized fluid PF from channel 124B is arranged to push ramp ring 106B in direction AD1 so that wedge plate 108B slides onto portion 114A, frictionally engaging groove 130B and portion 132B and non-rotatably connecting the combination of rotor 104 and wedge plate 108B for rotation of the combination of rotor 104 and wedge plate 108B, in direction CD2, with respect to stator 102.

For the retard mode, resilient element 120B is arranged to push ramp ring 106B in direction AD2 so that wedge plate 108B slides radially inward on portion 114B, breaking or diminishing frictional contact between groove 130B and portion 132B and enabling rotation between the combination of rotor 104 and wedge plate 108B, in direction CD2, with respect to stator 102. For the retard mode, pressurized fluid PF from channel 124A is arranged to push ramp ring 106A in direction AD2 so that wedge plate 108A slides onto portion 112A, frictionally engaging groove 130A and portion 132A and non-rotatably connecting the combination of rotor 104 and wedge plate 108A for rotation of the combination of rotor 104 and wedge plate 108A, in direction CD1, with respect to stator 102.

Figure 5C:
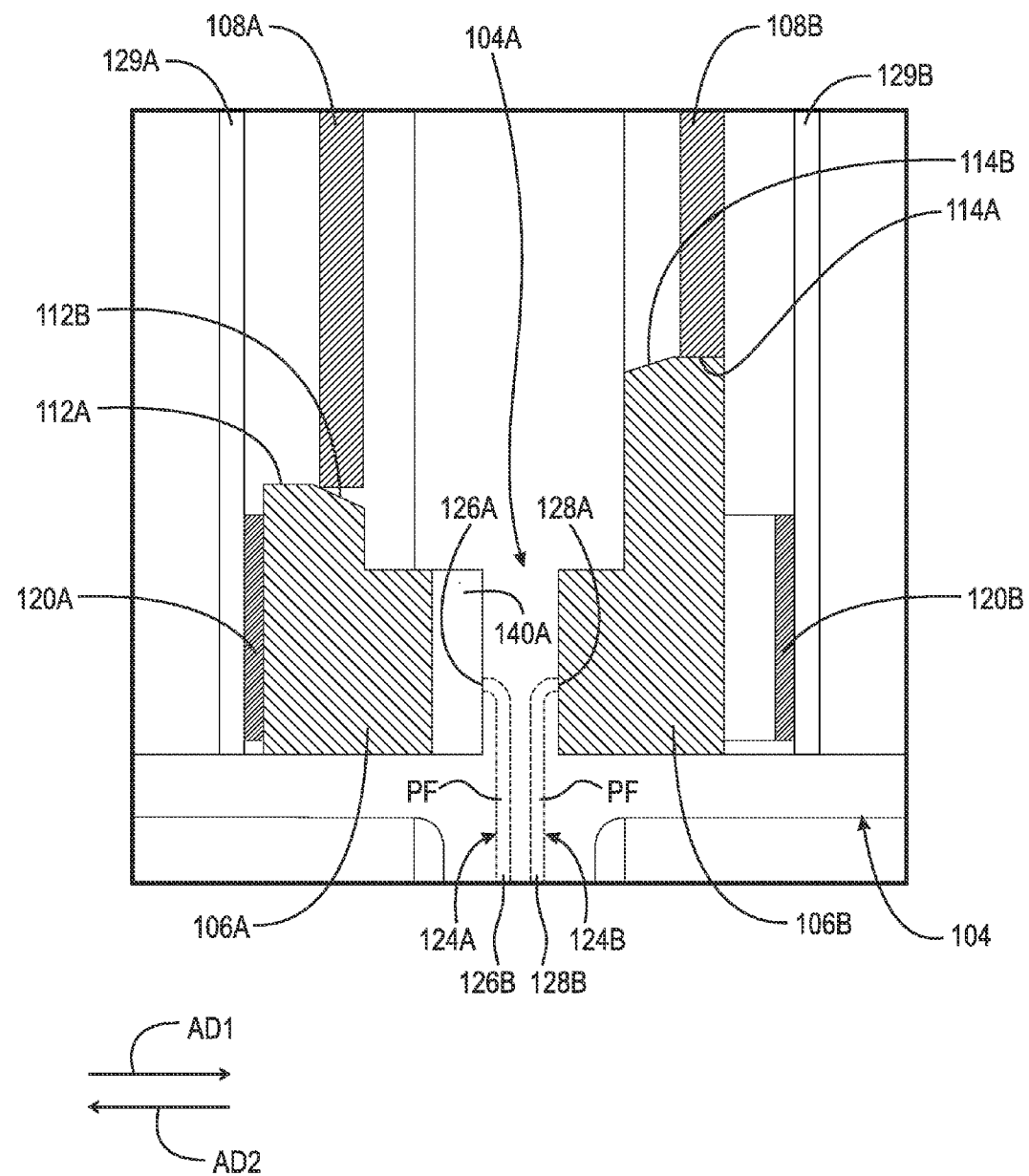
FIG. 5C is a detail of area 5A-F in FIG. 5 with the camshaft phaser in an advance mode.

FIG. 5C is a detail of area 5A-F in FIG. 5 with camshaft phaser 100 in an advance mode.

Figure 5D:
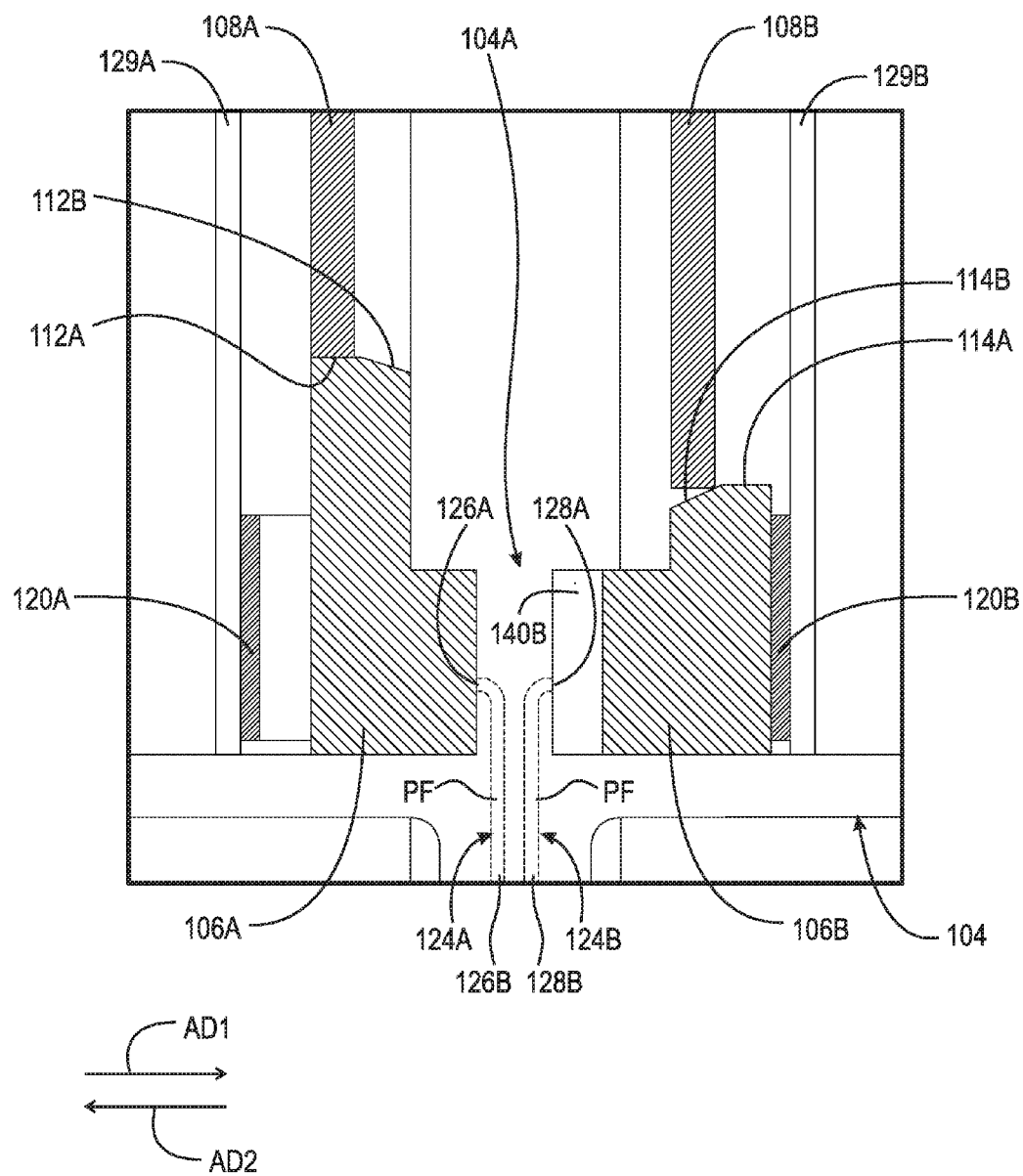
FIG. 5D is a detail of area 5A-F in FIG. 5 with the camshaft phaser in a retard mode.

FIG. 5D is a detail of area 5A-F in FIG. 5 with camshaft phaser 100 in a retard mode. In FIGS. 5C and 5D, the configurations of portions 112A, 112B, 114A and 114B as shown in FIGS. 5A and 5B, respectively, have been reversed. For the advance mode, pressurized fluid in channel 124A is arranged to push ramp ring 106A in direction AD2 so that wedge plate 108A slides radially inward on portion 112B, breaking or diminishing frictional contact between groove 130A and portion 132A and enabling rotation between the combination of rotor 104 and wedge plate 108A, in direction CD1, with respect to stator 102. For the advance mode, resilient element 120B is arranged to push ramp ring 106B in direction AD2 so that wedge plate 108B slides onto portion 114A, frictionally engaging groove 130B and portion 132B and non-rotatably connecting the combination of rotor 104 and wedge plate 108B for rotation of the combination of rotor 104 and wedge plate 108B, in direction CD2, with respect to stator 102.

Examples of resilient elements 120A and 120B include wave washers as shown in FIG. 4 and any other suitable resilient elements capable of axially displacing a ramp ring, as described above and below.

For the retard mode, pressurized fluid in channel 124B is arranged to push ramp ring 106B in direction AD1 so that wedge plate 108B slides radially inward on portion 114B, breaking or diminishing frictional contact between groove 130B and portion 132B and enabling rotation between the combination of rotor 104 and wedge plate 108B, in direction CD2, with respect to stator 102. For the retard mode, resilient element 120A is arranged to push ramp ring 106A in direction AD1 so that wedge plate 108A slides onto portion 112A, frictionally engaging groove 130A and portion 132A and non-rotatably connecting the combination of rotor 104 and wedge plate 108A for rotation of the combination of rotor 104 and wedge plate 108A, in direction CD1, with respect to stator 102.

Figure 5E:
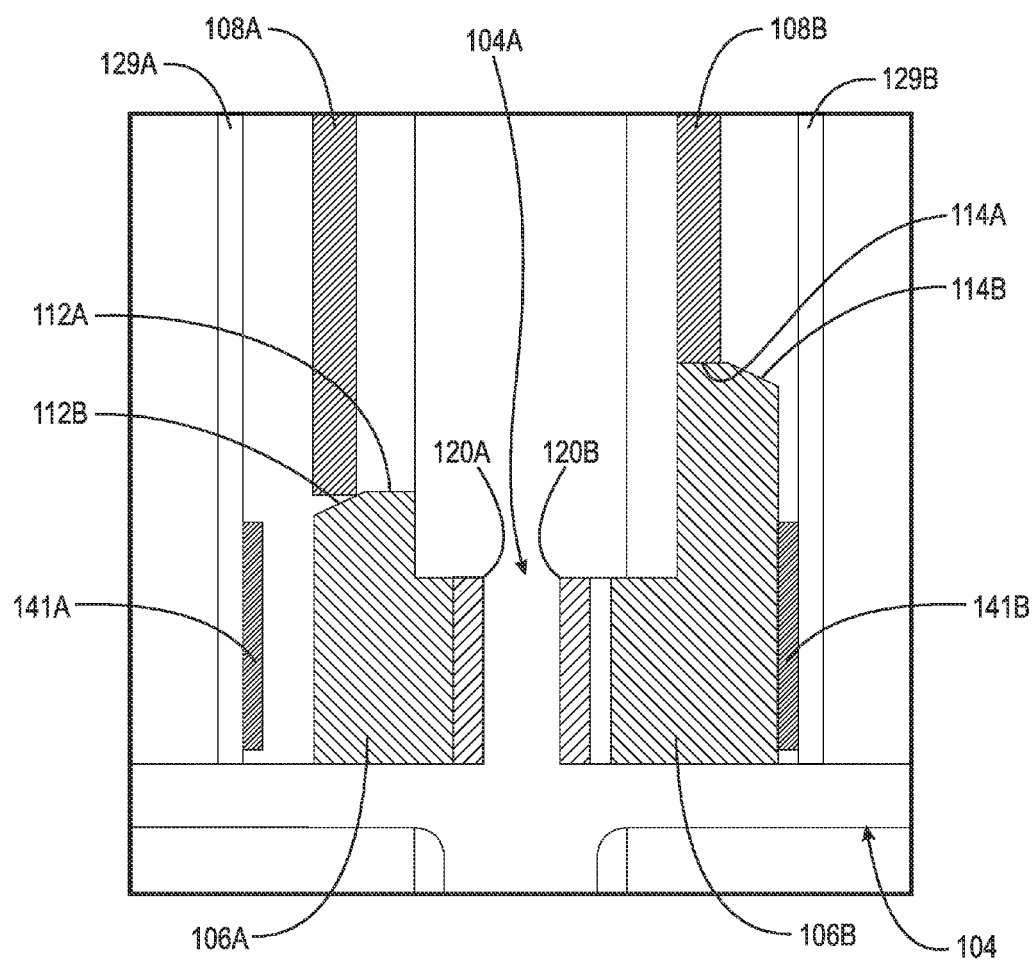
FIG. 5E is a detail of area 5A-F in FIG. 5 with a camshaft phaser, having a magnetic actuator, in an advance mode.

FIG. 5E is a detail of area 5A-F in FIG. 5 with camshaft phaser 100, having a magnetic actuator, in an advance mode.

Figure 5F:
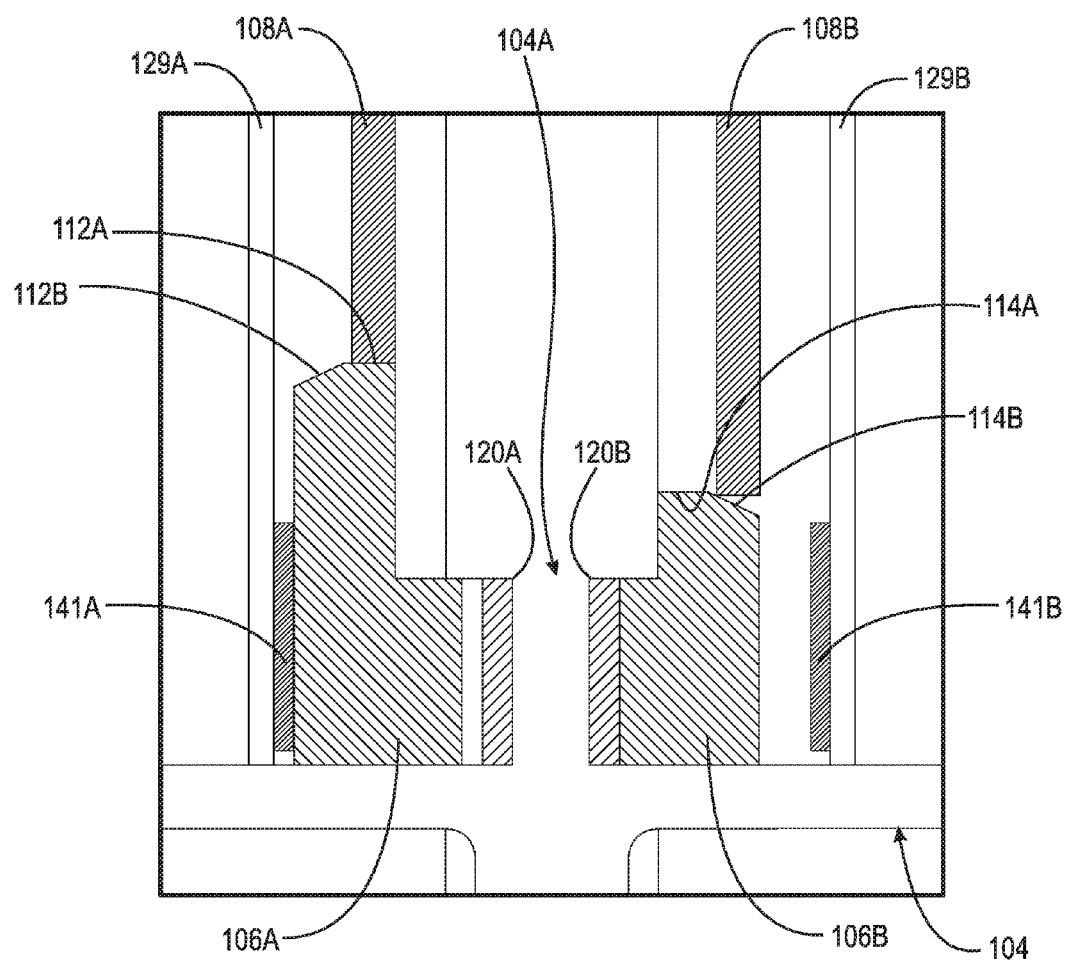
FIG. 5F is a detail of area 5A-F in FIG. 5 with the camshaft phaser, having the magnetic actuator, in a retard mode.
Figure 5F:
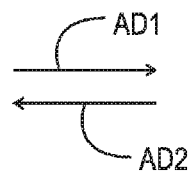

FIG. 5F is a detail of area 5A-F in FIG. 5 with camshaft phaser 100, having the magnetic actuator, in a retard mode. In FIGS. 5E and 5F, resilient elements 120A and 120B are located axially between the stator and ramp rings 106A and 106B, respectively. In addition, phaser 100 includes electro-magnetic actuators 141A and 141B. For the advance mode, actuator 141A is energized to push ramp ring 106A (via magnetic repulsion) in direction AD1 so that wedge plate 108A slides radially inward on portion 112B, breaking or diminishing frictional contact between groove 130A and portion 132A and enabling rotation between the combination of rotor 104 and wedge plate 108A, in direction CD1, with respect to stator 102. For the advance mode, resilient element 120B is arranged to push ramp ring 106B in direction AD1 so that wedge plate 108B slides onto portion 114A, frictionally engaging groove 130B and portion 132B and non-rotatably connecting the combination of rotor 104 and wedge plate 108B for rotation of the combination of rotor 104 and wedge plate 108B, in direction CD2, with respect to stator 102. Electro-magnetic actuators 141A and 141B can be any electro-magnetic actuators known in the art.

For the retard mode, actuator 141B is energized to push ramp ring 106B in direction AD2 (via magnetic repulsion) so that wedge plate 108B slides radially inward on portion 114B, breaking or diminishing frictional contact between groove 130B and portion 132B and enabling rotation between the combination of rotor 104 and wedge plate 108B, in direction CD2, with respect to stator 102. For the retard mode, resilient element 120A is arranged to push ramp ring 106A in direction AD2 so that wedge plate 108A slides onto portion 112A, frictionally engaging groove 130A and portion 132A and non-rotatably connecting the combination of rotor 104 and wedge plate 108A for rotation of the combination of rotor 104 and wedge plate 108A, in direction CD1, with respect to stator 102.

Figure 12:
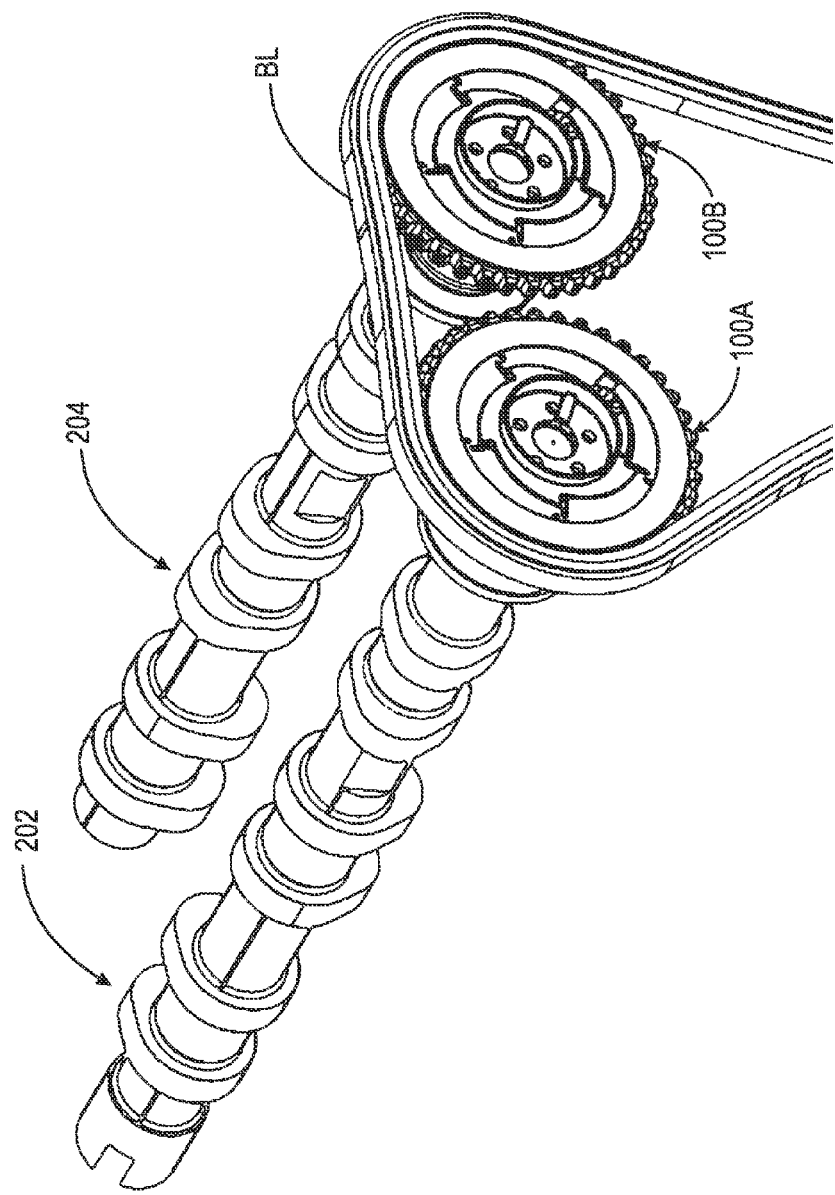
FIG. 12 is a perspective view of the camshaft phasers of FIGS. 2 and 3 connected to respective camshafts.

FIG. 12 is a perspective view of camshaft phasers 100A and 100B connected to camshafts 202 and 204, respectively. The discussion regarding phaser 100 is applicable to phasers 100A and 100B. Typically, one of camshafts 202 and 204 is for an intake valve train and the other of camshafts 202 and 204 is for an exhaust valve train. Phasers 100A and 100B are rotated by chain (simplified chain model—chain sprockets are shown) BL, typically driven by a crankshaft for an engine of which the camshafts and phasers are a part. The following discussion is directed to phaser 100A; however, it should be understood that the discussion is applicable to phaser 100B as well.

In the discussion that follows, stator 102 rotates in direction CD1 in response to torque from chain BL. As is known in the art, torsional forces T1 and T2 are transmitted from camshaft 202, in directions CD1 and CD2, respectively, to rotor 104 during operation of phaser 100. The torsional force forces are due to interaction of cam lobes on camshaft 202 with various components of a valve train (not shown) of which camshaft 202 is a part. Torsional forces T1 and T2 are transmitted in a repeating cycle. Rotor 104 rotates in direction CD1; however, torsional force T1 urges rotor 104 in direction CD1 with respect to the stator and torsional force T2 urges rotor 104 in direction CD2 with respect to the stator.

The following provides further detail regarding operation of the example embodiment phaser 100 in FIGS. 2 through 5B and 6 through 11. As shown in FIG. 5 for a drive mode, when pressurized fluid PF is supplied to channels 124A and 124B, stator 102 and rotor 104 are non-rotatably connected via wedge plates 108A and 108B. Specifically, pressurized fluid PF is supplied to: chamber 140A via channel 124A and opening 126A; and chamber 140B via channel 124B and opening 128A. Pressure in chamber 140A forces ramp ring 106A in direction AD2 (against force from resilient element 120A) so that wedge plate 108A is pushed on portions 112A. When wedge plate 108A is disposed about portions 112A, portion 132A of wedge plate 108A is frictionally engaged with stator 102. Pressure in chamber 140B forces ramp ring 106B in direction AD1 (against force from resilient element 120B) so that wedge plate 108B is pushed on portions 114A. Due to the frictional engagement of circumferences 130A and 130B, the wedge plates rotate with the stator in direction CD1.

Relative rotation of rotor 104, with respect to the stator, in direction CD1 causes ramps 112 to slide along ramps 116 and displace wedge plate 108A radially outward, compressively engaging wedge plate 108A with stator 102 and rotor 104 and non-rotatably connecting stator 102, wedge plate 108A, and rotor 104. Relative rotation of rotor 104, with respect to the stator, in direction CD2 causes ramps 114 to slide along ramps 118 and displace wedge plate 108B radially outward, compressively engaging wedge plate 108B with stator 102 and rotor 104 and non-rotatably connecting stator 102, wedge plate 108B, and rotor 104. Wedge plate 108A does not block rotation of the rotor in direction CD2 and wedge plate 108B does not block rotation of the rotor in direction CD1.

To enable rotation of the rotor, with respect to the stator, in direction CD1, pressurized fluid PF is drained from chamber 140A via channel 124A and opening 126A. Resilient element 120A displaces ramp ring 106A in direction AD1 so that wedge plate 108A slides down portion 112B. Wedge plate 108A radially contracts on portion 112B so that outer circumference 130A no longer is in frictional engagement with the stator. Thus, ramps 112 slide down ramps 116 and wedge plate 108A and rotor 104 are rotatable, with respect to the stator, in direction CD1. As noted above, wedge plate 108B does not block rotation of the rotor in direction CD1.

To enable rotation of the rotor, with respect to the stator, in direction CD2, pressurized fluid PF is drained from chamber 140B via channel 124B and opening 128A. Resilient element 120B displaces ramp ring 106B in direction AD2 so that wedge plate 108B slides down portion 114B. Wedge plate 108B radially contracts on portion 114B so that outer circumference 130B no longer is in frictional engagement with the stator. Thus, ramps 114 slide down ramps 118 and wedge plate 108B and rotor 104 are rotatable, with respect to the stator, in direction CD2. As noted above, wedge plate 108A does not block rotation of the rotor in direction CD2.

Phaser 100A is configured to operate in at least three modes: a drive mode; the advance mode; and the retard mode. In the drive mode, the stator receives rotational torque T1 from chain or belt BL, for example in direction CD1. In drive mode, pressurized fluid is supplied to channels 124A and 124B and chambers 140A and 140B urging ramp rings 106A and 106B in directions AD2 and AD1, respectively. Wedge plates 108A and 108B are located on portions 112A and 114A. As noted above, in this configuration, stator 102 and rotor 104 are non-rotatably connected for rotation of rotor 104, with respect to stator 102 in direction CD1 due to torque T1 and in direction CD2 due to torque T2.

The following describes the advance mode. Assume stator 102 is rotating in direction CD1 and phaser 100A receives torsional force T1. Fluid PF is drained from channel 124A and chamber 140A. Resilient element 120A displaces ramp ring 106A in direction AD1 so that wedge plate 108A slides down portions 112B enabling, as noted above, rotation of rotor 104, with respect to stator 102, in direction CD1, for example by distance 142A. Also as noted below, wedge plate 108B on portions 114A does not block rotation of the rotor in direction CD2.

The rotor then receives torque T2. Torque T2 on rotor 104 urges the rotor in direction CD2. As noted above, as soon as the rotor is urged in direction CD2, ramps 114 slide up ramps 118 to non-rotatably connect the rotor, wedge plate 108B, and the stator. Thus, rotor 104 is prevented from rotating back in direction CD2, which would cancel the displacement in distance 142A. Therefore, in the advance mode, for each cycle of torques T1 and T2, rotor 104 rotates distance 142A in direction CD1. For successive cycles of T1 and T2 in the advance mode, rotor 104 displaces distance 142A, with respect to stator 102, in direction CD1. That is, this process is repeatable via successive cycles of torsional forces T1 and T2 to attain a desired shift of rotor 104.

The following describes the retard mode. Assume stator 102 is rotating in direction CD1 and phaser 100A receives torsional force T2. Fluid PF is drained from channel 124B and chamber 140B. Resilient element 120B displaces ramp ring 106B in direction AD2 so that wedge plate 108B slides down portions 114B enabling, as noted above, rotation of rotor 104, with respect to stator 102, in direction CD2, for example by distance 142B. Also as noted below, wedge plate 108A on portions 112A does not block rotation of the rotor in direction CD1.

The rotor then receives torque T1. Torque T1 on rotor 104 urges the rotor in direction CD1. As noted above, as soon as the rotor is urged in direction CD1, ramps 112 slide along ramps 116 to non-rotatably connect the rotor, wedge plate 108A, and the stator. Thus, rotor 104 is prevented from rotating back in direction CD1, which would cancel the displacement in distance 142B. Therefore, in the advance mode, for each cycle of torques T1 and T2, rotor 104 rotates distance 142B in direction CD2. For successive cycles of T1 and T2 in the advance mode, rotor 104 displaces distance 142B, with respect to stator 102, in direction CD2. That is, this process is repeatable via successive cycles of torsional forces T1 and T2 to attain a desired shift of rotor 104.

Each distance 142A is a result of phaser 100A implementing a full cycle of torsional force forces T1 and T2. To shift rotor 104 in direction CD1 by distance 144A, less than distance 142A, pressurized fluid PF is supplied to channel 124A and chamber 140A after rotor 104 has begun rotation in direction CD1 (by distance 144A) but before rotor 104 has rotated distance 142A. Fluid PF overcomes force applied by resilient element 120A to displace ramp ring 106A in direction AD2 so that wedge plate 108A slides up portions 112B to portions 112A and the frictional engagement of wedge plate 108A and stator 102 non-rotatably connects stator 102 and rotor 104 halting rotation of rotor 104 at distance 144A.

Each distance 142B is a result of phaser 100A implementing a full cycle of torsional force forces T1 and T2. To shift rotor 104 in direction CD2 by distance 144B, less than distance 142B, pressurized fluid PF is supplied to channel 124B and chamber 140B after rotor 104 has begun rotation in direction CD2 (by distance 144B) but before rotor 104 has rotated distance 142B. Fluid PF overcomes force applied by resilient element 120B to displace ramp ring 106B in direction AD1 so that wedge plate 108B slides up portions 114B to portions 114A and the frictional engagement of wedge plate 108B and stator 102 non-rotatably connects stator 102 and rotor 104 halting rotation of rotor 104 at distance 144B.

The discussion of the drive, advance and retard modes is applicable to FIGS. 5C and 5D, with the following exceptions: for the drive mode, resilient elements 120A and 120B urge ramp rings 106A and 106B in directions AD1 and AD2, respectively; for the advance mode, fluid PF in chamber 140A and resilient element 120B urge ramp rings 106A and 106B, respectively, in direction AD2; and for the retard mode, resilient element 120A and fluid PF in chamber 140B urge ramp rings 106A and 106B, respectively, in direction AD1.

The discussion of the drive, advance and retard modes is applicable to FIGS. 5E and 5F, with the following exceptions: displacement of ramp ring 106A in directions AD1 and AD2 is by actuator 141A and resilient element 120A, respectively; and displacement of ramp ring 106B in directions AD2 and AD1 is by actuator 141B and resilient element 120B, respectively.

Thus, rotor 104 can be controllably and repeatedly rotated virtually any amount with respect to stator 102 in the advance and retard modes, while remaining substantially fixed to stator 102 in the drive mode.

The following should be viewed in light of FIGS. 2 through 12. The following describes a method for fabricating a camshaft phaser. Although the method is presented as a sequence of steps for clarity, no order should be inferred from the sequence unless explicitly stated. A first step fabricates a rotor including a core portion, a central opening through which an axis of rotation for the camshaft phaser passes, at least one first channel with at least one first opening at the central opening and at least one second opening at the core portion, and at least one second channel with at least one third opening at the central opening and at least one fourth opening at the core portion. A second step fabricates a first ramp ring, including a first plurality of ramps. A third step disposes the first ramp ring radially about the rotor and axially aligned with the at least one second opening. A fourth step non-rotatably connects the first ramp ring to the rotor. A fifth step fabricates a second ramp ring, including a second plurality of ramps. A sixth step disposes the first ramp ring radially about the rotor, axially aligned with the at least one fourth opening, and so that the core portion is axially disposed between the first and second ramp rings. A seventh step non-rotatably connects the second ramp ring to the rotor. An eighth step installs a first wedge plate, including a third plurality of ramps, radially between the stator and the first ramp ring. A ninth step engages the first plurality of ramp rings with the third pluralities of ramps. A tenth step installs a second wedge plate, including a fourth plurality of ramps, radially between the stator and the second ramp ring. An eleventh step engages the second plurality of ramps with the fourth plurality of ramps. A twelfth step directly connects a first resilient element to the first ramp ring. A thirteenth step urges the first ramp ring toward the rotor with the first resilient element. A fourteenth step directly connects a second resilient element to the second ramp ring. A fifteenth step urges the second ramp ring toward the rotor with the second resilient element. A sixteenth step installs the rotor and the first and second wedge plates within a stator including an input gear.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

REFERENCE VARIABLES 10 system
11 axis
12 object
13 object
14 object
15 surface
16 surface
17 radius
18 surface
19 circumference
AD axial direction
AD1 axial direction
AD2 axial direction
AR axis of rotation
BL chain
CD circumferential direction
CD1 circumferential direction
CD2 circumferential direction
R radius
RD radial direction
PF pressurized fluid
T1 torsional force
T2 torsional force
100 camshaft phaser
100A camshaft phaser
100B camshaft phaser
102 stator
104 rotor
104A central portion
106A ramp ring
106B ramp ring
108A wedge plate
108B wedge plate
110 displacement assembly
112 ramp
112A portion
112B portion
114 ramp 114A portion
114B portion
116 ramp
118 ramp
120A resilient element
120B resilient element
122 central opening
124A channel
124B channel
126A opening
126B opening
128A opening
128B opening
129A side plate
129B side plate
130A groove
130B groove
132A portion
132B portion
140A chamber
140B chamber
141A electro-magnetic actuator
141B electro-magnetic actuator
142A distance
142B distance
144A distance
144B distance
202 camshaft
204 camshaft

What is claimed is:

1. A camshaft phaser, comprising:
a stator arranged to receive torque from an engine;
a rotor arranged to be non-rotatably connected to a camshaft;
first and second ramp rings:
radially disposed about the rotor; and,
non-rotatably connected to the rotor;
a first wedge plate radially disposed between the stator and the first ramp ring;
a second wedge plate radially disposed between the stator and the second ramp ring; and,
a displacement assembly arranged to:
displace the first ramp ring in a first axial direction to enable rotation of the rotor, with respect to the stator, in a first circumferential direction, for an advance mode; and,
displace the second ramp ring in a second axial direction, opposite the first axial direction, to enable rotation of the rotor, with respect to the stator, in a second circumferential direction, opposite the first circumferential direction, for a retard mode.

2. The camshaft phaser of claim 1, wherein:
the displacement assembly is arranged to displace the second ramp ring in the first axial direction to block rotation of the rotor, with respect to the stator, in the second circumferential direction, in the advance mode; and,
the displacement assembly is arranged to displace the first ramp ring in the second axial direction to block rotation of the rotor, with respect to the stator, in the first circumferential direction, in the retard mode.

3. The camshaft phaser of claim 1, wherein:
the first ramp ring includes a first plurality of ramps;
the second ramp ring includes a second plurality of ramps;
the first and second wedge plates include third and fourth pluralities of ramps, respectively, engaged with the first and second pluralities of ramps, respectively;
the second plurality of ramps is arranged to slide along the fourth plurality of ramps in the second circumferential direction in the advance mode; and,
the first plurality of ramps is arranged to slide along the third plurality of ramps in the first circumferential direction in the retard mode.

4. The camshaft phaser of claim 3, wherein:
each ramp in the first plurality of ramps includes a respective first portion sloping radially inward in the second axial direction;
each ramp in the second plurality of ramps includes a respective second portion sloping radially inward in the first axial direction:
for the advance mode, the displacement assembly is arranged to:
engage the first wedge plate with the respective first portions; and,
disengage the second wedge plate from the respective second portions; and,
for the retard mode, the displacement assembly is arranged to:
engage the second wedge plate with the respective second portions; and,
disengage the first wedge plate from the respective first portions.

5. The camshaft phaser of claim 3, wherein:
each ramp in the first plurality of ramps includes a respective first portion sloping radially inward in the first axial direction;
each ramp in the second plurality of ramps includes a respective second portion sloping radially inward in the second axial direction:
for the advance mode, the displacement assembly is arranged to:
engage the first wedge plate with the respective first portions; and,
disengage the second wedge plate from the respective second portions; and,
for the retard mode, the displacement assembly is arranged to:
engage the second wedge plate with the respective second portions; and,
disengage the first wedge plate from the respective first portions.

6. The camshaft phaser of claim 1, wherein:
the rotor includes a central portion axially disposed between the first and second ramp rings; and,
the first axial direction is from the central portion toward the first wedge plate and the second axial direction is from the central portion toward the second wedge plate; or,
the first axial direction is from the first wedge plate toward the central portion and the second axial direction is from the second wedge plate toward the central portion.

7. The camshaft phaser of claim 1, wherein the displacement assembly includes:
a first resilient element arranged to displace the first ramp ring in the first axial direction; and,
a second resilient element arranged to displace the second ramp ring in the second axial direction.

8. The camshaft phaser of claim 7, wherein:
the rotor includes:
a central opening through which an axis of rotation for the camshaft phaser passes; and,
a central portion of the rotor axially disposed between the first and second ramp rings;

the displacement assembly includes:
at least one first channel in the rotor:
with at least one first opening at the central opening and at least one second opening at the central portion; and,
arranged to receive pressurized fluid to displace the first ramp ring in the second axial direction; and,
at least one second channel in the rotor:
with at least one third opening at the central opening and at least one fourth opening at the central portion; and,
arranged to receive pressurized fluid to displace the second ramp ring in the first axial direction.

9. The camshaft phaser of claim 7, wherein the first and second resilient elements are wave washers.

10. The camshaft phaser of claim 1, wherein for a drive mode the displacement assembly is arranged to:
displace the second ramp ring in the first axial direction to block rotation of the rotor, with respect to the stator, in the second circumferential direction; and,
displace the first ramp ring in the second axial direction to block rotation of the rotor, with respect to the stator, in the first circumferential direction.

11. The camshaft phaser of claim 1, wherein the displacement assembly includes:
a first resilient element arranged to displace the first ramp ring in the second axial direction; and,
a second resilient element arranged to displace the second ramp ring in the first axial direction.

12. The camshaft phaser of claim 11, further comprising:
first and second side plates, wherein:
the first and second ramp rings are axially disposed between the first and second side plates;
the first resilient element is axially disposed between the first ramp ring and the first side plate; and,
the second resilient element is axially disposed between the second ramp ring and the second side plate.

13. The camshaft phaser of claim 12, wherein:
the rotor includes:
a central opening through which an axis of rotation for the camshaft phaser passes; and,
a central portion of the rotor axially disposed between the first and second ramp rings;
the displacement assembly includes:
at least one first channel in the rotor:
with at least one first opening at the central opening and at least one second opening at the central portion; and,
arranged to receive pressurized fluid to displace the first ramp ring in the first axial direction; and,
at least one second channel in the rotor:
with at least one third opening at the central opening and at least one fourth opening at the central portion; and,
arranged to receive pressurized fluid to displace the second ramp ring in the second axial direction.

14. The camshaft phaser of claim 1, wherein the displacement assembly includes:
a first magnetic actuator arranged to displace the first ramp ring in the first axial direction; and,
a second magnetic actuator arranged to displace the second ramp ring in the second axial direction.

15. The camshaft phaser of claim 1, wherein:
the rotor is arranged to receive a plurality of torque cycles from the camshaft;

each torque cycle included in the plurality of torque cycles includes a first torque in the first circumferential direction followed by a second torque in the second circumferential direction;
in the advance mode, for a first torque cycle included in the plurality of torque cycles:
the stator is arranged to rotate in the first circumferential direction;
the rotor is arranged to receive the first and second torques;
the rotor is arranged to rotate, with respect to the stator, a first distance in the first circumferential direction; and,
the displacement assembly is arranged to displace the second ramp ring in the first axial direction to displace the second wedge plate radially outward to block rotation of the rotor, with respect to the stator, in the second circumferential direction; and,
in the retard mode, for a second torque cycle included in the plurality of torque cycles:
the stator is arranged to rotate in the first circumferential direction;
the rotor is arranged to receive the first and second torques;
the rotor is arranged to rotate, with respect to the stator, a second distance in the second circumferential direction; and,
the displacement assembly is arranged to displace the first ramp ring in the second axial direction to displace the first wedge plate radially outward to block rotation of the rotor, with respect to the stator, in the first circumferential direction.

16. The camshaft phaser of claim 15, wherein:
the displacement assembly is arranged to displace the first wedge plate in the second circumferential direction to block rotation of the rotor, with respect to the stator in the first circumferential direction, after the rotor has begun rotating in the first circumferential direction and before the rotor has rotated the first distance in the first circumferential direction, in the advance mode for a third torque cycle included in the plurality of torque cycles; or,
the displacement assembly is arranged to displace the second wedge plate in the first circumferential direction to block rotation of the rotor, with respect to the stator in the second circumferential direction, after the rotor has begun rotating in the second circumferential direction and before the rotor has rotated the second distance in the second circumferential direction, in the retard mode, for a transition from the third torque cycle included in the plurality of torque cycles to a fourth torque cycle in the plurality of torque cycles.

17. A camshaft phaser, comprising:
stator including an input gear;
a rotor arranged to be non-rotatably connected to a camshaft and including a central opening through which an axis of rotation for the camshaft phaser passes;
first and second ramp rings:
radially disposed about the rotor; and,
non-rotatably connected to the rotor;
a first wedge plate radially disposed between the stator and the first ramp ring;
a second wedge plate radially disposed between the stator and the second ramp ring; and,
a displacement assembly including:

at least one first and second channels opening to the central opening; and, first and second resilient elements, wherein:

the first resilient element is arranged to displace the first ramp ring in a first axial direction to enable rotation of the rotor, with respect to the stator, in a first circumferential direction, in an advance mode; and, the second resilient element is arranged to displace the second ramp ring in a second axial direction, opposite the first axial direction, to enable rotation of the rotor, with respect to the stator, in a second circumferential direction, opposite the first circumferential direction, in a retard mode; or, wherein:

the at least one first channel is arranged to transmit pressurized fluid to displace the first ramp ring in the first axial direction to enable rotation of the rotor, with respect to the stator, in the first circumferential direction, in the advance mode; and, the at least one second channel is arranged to transmit pressurized fluid to displace the second ramp ring in the second axial direction, opposite the first axial direction, to enable rotation of the rotor, with respect to the stator, in the second circumferential direction, opposite the first circumferential direction, in the retard mode.

18. The camshaft phaser of claim 17, wherein:

for the advance mode:

the first resilient element is arranged to displace the first ramp ring in the first axial direction; and, the at least one first channel is arranged to transmit pressurized fluid to displace the second ramp ring in the second axial direction; and, for the retard mode:

the second resilient element is arranged to displace the second ramp ring in the second axial direction; and, the at least one second channel is arranged to transmit pressurized fluid to displace the second ramp ring in the first axial direction.

19. The camshaft phaser of claim 17, wherein:

for the advance mode:

the at least one first channel is arranged to transmit pressurized fluid to displace the first ramp ring in the first axial direction; and, the first resilient element is arranged to displace the first ramp ring in the second axial direction; and, for the retard mode:

the at least one second channel is arranged to transmit pressurized fluid to displace the second ramp ring in the second axial direction; and, the second resilient element is arranged to displace the second ramp ring in the first axial direction.

20. The camshaft phaser of claim 17, wherein:

the first ramp ring includes a first portion sloping radially inward in the second axial direction;

the second ramp ring includes a second portion sloping radially inward in the first axial direction:

for the advance mode, the displacement assembly is arranged to:

engage the first wedge plate with the first portion; and, disengage the second wedge plate from the second portion; and, for the retard mode, the displacement assembly is arranged to:

engage the second wedge plate with the second portion; and, disengage the first wedge plate from the first portion; or, wherein:

the first ramp ring includes a first portion sloping radially inward in the first axial direction;

the second ramp ring includes a second portion sloping radially inward in the second axial direction:

for the advance mode, the displacement assembly is arranged to:

engage the first wedge plate with the first portion; and, disengage the second wedge plate from the second portion; and, for the retard mode, the displacement assembly is arranged to:

engage the second wedge plate with the second portion; and, disengage the first wedge plate from the first portion.

21. A method of fabricating a camshaft phaser, comprising:

fabricating a rotor including:

a core portion;

a central opening through which an axis of rotation for the camshaft phaser passes;

at least one first channel with at least one first opening at the central opening and at least one second opening at the core portion; and, at least one second channel with at least one third opening at the central opening and at least one fourth opening at the core portion;

fabricating a first ramp ring, including a first plurality of ramps;

disposing the first ramp ring:

radially about the rotor; and, axially aligned with the at least one second opening;

non-rotatably connecting the first ramp ring to the rotor;

fabricating a second ramp ring, including a second plurality of ramps;

disposing the second ramp ring:

radially about the rotor;

axially aligned with the at least one fourth opening; and, so that the core portion is axially disposed between the first and second ramp rings;

non-rotatably connecting the second ramp ring to the rotor;

installing a first wedge plate, including a third plurality of ramps, radially between the stator and the first ramp ring;

engaging the first plurality of ramps with the third pluralities of ramps;

installing a second wedge plate, including a fourth plurality of ramps, radially between the stator and the second ramp ring;

engaging the second plurality of ramps with the fourth plurality of ramps;

directly connecting a first resilient element to the first ramp ring;

urging the first ramp ring toward the rotor with the first resilient element;

directly connecting a second resilient element to the second ramp ring;

urging the second ramp ring toward the rotor with the second resilient element; and, installing the rotor and the first and second wedge plates within a stator including an input gear.

* * * * *